May 30, 1967

R. S. PRESLEY 3,322,166

WIRE BENDING MACHINE CONTROL APPARATUS

Filed Aug. 17, 1964

INVENTOR.
RONALD S. PRESLEY
BY
Olsen and Stephenson
ATTORNEYS

May 30, 1967   R. S. PRESLEY   3,322,166
WIRE BENDING MACHINE CONTROL APPARATUS
Filed Aug. 17, 1964   2 Sheets-Sheet 2
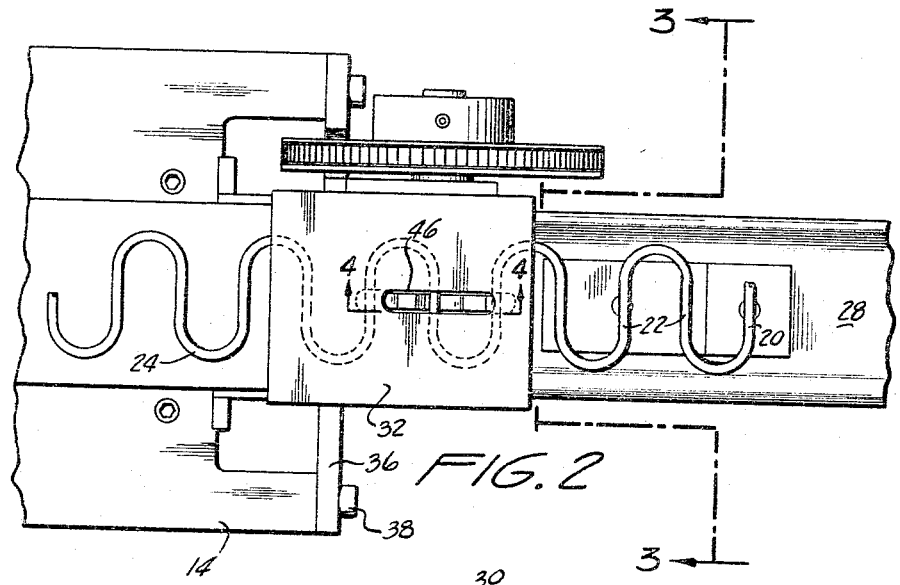
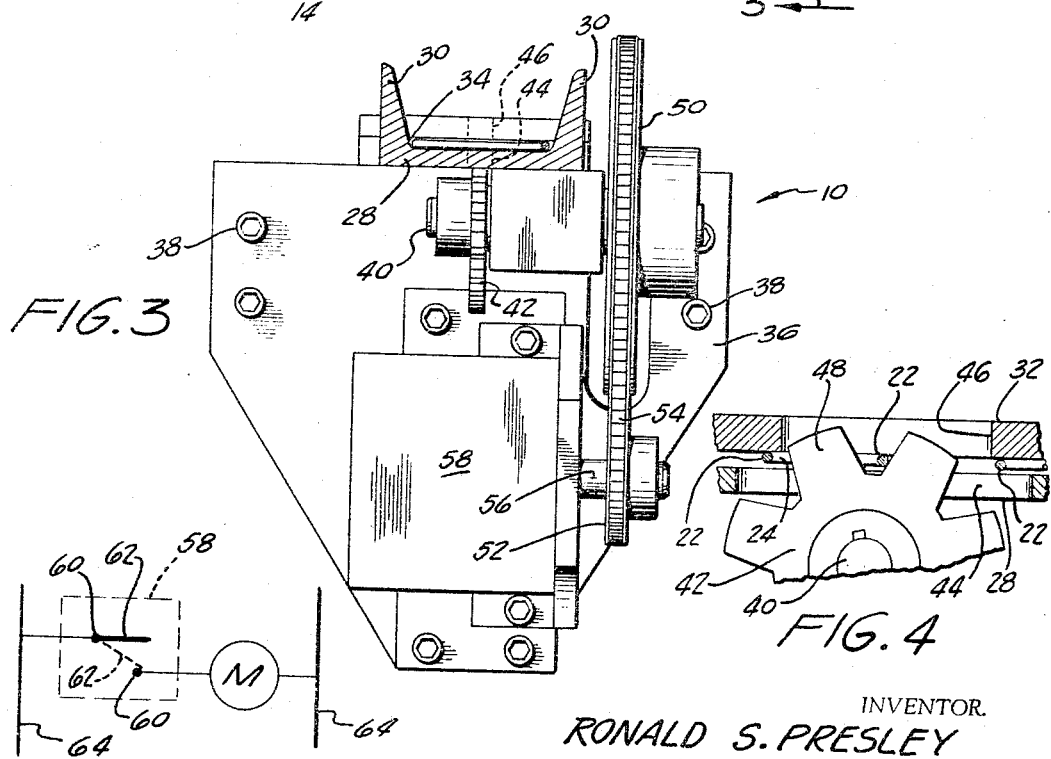
INVENTOR.
RONALD S. PRESLEY
BY
Olsen and Stephenson
ATTORNEYS

United States Patent Office 3,322,166
Patented May 30, 1967

3,322,166
WIRE BENDING MACHINE CONTROL APPARATUS
Ronald S. Presley, Georgetown, Ky., assignor to Hoover Ball and Bearing Company, Saline, Mich., a corporation of Michigan
Filed Aug. 17, 1964, Ser. No. 389,988
3 Claims. (Cl. 140—105)

This invention relates generally to wire bending machines and more particularly to control apparatus for a wire bending machine which manufactures wire that is variously described as "zigzag," "corrugated," or "sinuous."

In certain wire bending machines such as the machine illustrated in United States Patent No. 2,849,031 issued Aug. 26, 1958, and assigned to the assignee of this application, wire from a large coil on a reel is continuously supplied to the machine until the coil is exhausted, after which another coil is substituted. Such a machine has a large number of working parts which cooperate to draw the wire into the machine and bend it into a continuous length of corrugated shape wire which is useful as a spring material. For this reason, such machines are sometimes called "corrugators." The sinuous shape wire, which is well known, has evenly spaced substantially parallel cross wire portions joined by curved connecting wire portions, and is subsequently cut into spring length strips. It is an object of this invention to provide control apparatus which operates to shut off a wire bending machine of this type under certain conditions to thereby prevent the machine from running unnecessarily and from running during a malfunction, to thus avoid compounding a jam-up of wire or damaging the machine. Another object of this invention is to provide control apparatus which is capable of shutting off the machine under the conditions described above which can readily be assembled with existing wire bending machines to insure efficient operation thereof.

In accordance with the above objects, the apparatus of this invention provides a zero speed switch which is mounted on the machine so that it is driven by movement of the cross wire portions of sinuous wire bent in the bending machine. Accordingly, when the machine runs out of wire, or becomes jammed, sinuous wire from the machine ceases to drive the zero speed switch which then operates to shut off the machine. The sinuous wire bent in the machine is moved along a predetermined path by the machine elements, and a toothed wheel in the control apparatus of this invention is mounted so that it projects into that path for driving by the cross wire portions, so that during normal operation of the machine the wheel is continuously rotated. A drive mechanism extended between the wheel and the zero speed switch provides for driving of the switch by the sinuous wire from the machine. As used herein, the term "zero speed switch" means a switch having a moving part, such as a shaft, which when the rate of movement of the part is below a predetermined rate changes the position of the switch contacts.

Further objects, features and advantages of this invention will become apparent from a consideration of the following description, the appended claims, and the accompanying drawing in which:

FIGURE 2 is a fragmentary top view of a portion of the machine shown in FIG. 1 showing the control apparatus of this invention mounted thereon;

FIGURE 3 is a fragmentary sectional view showing the apparatus of this invention as seen from substantially the line 3—3 in FIG. 2;

FIGURE 4 is a fragmentary sectional view looking substantially along the line 4—4 in FIG. 2; and FIGURE 5 is a circuit diagram illustrating the connection of the zero speed switch in the control apparatus of this invention with the drive motor for the wire bending machine on which the control apparatus is mounted.

Figure 1:
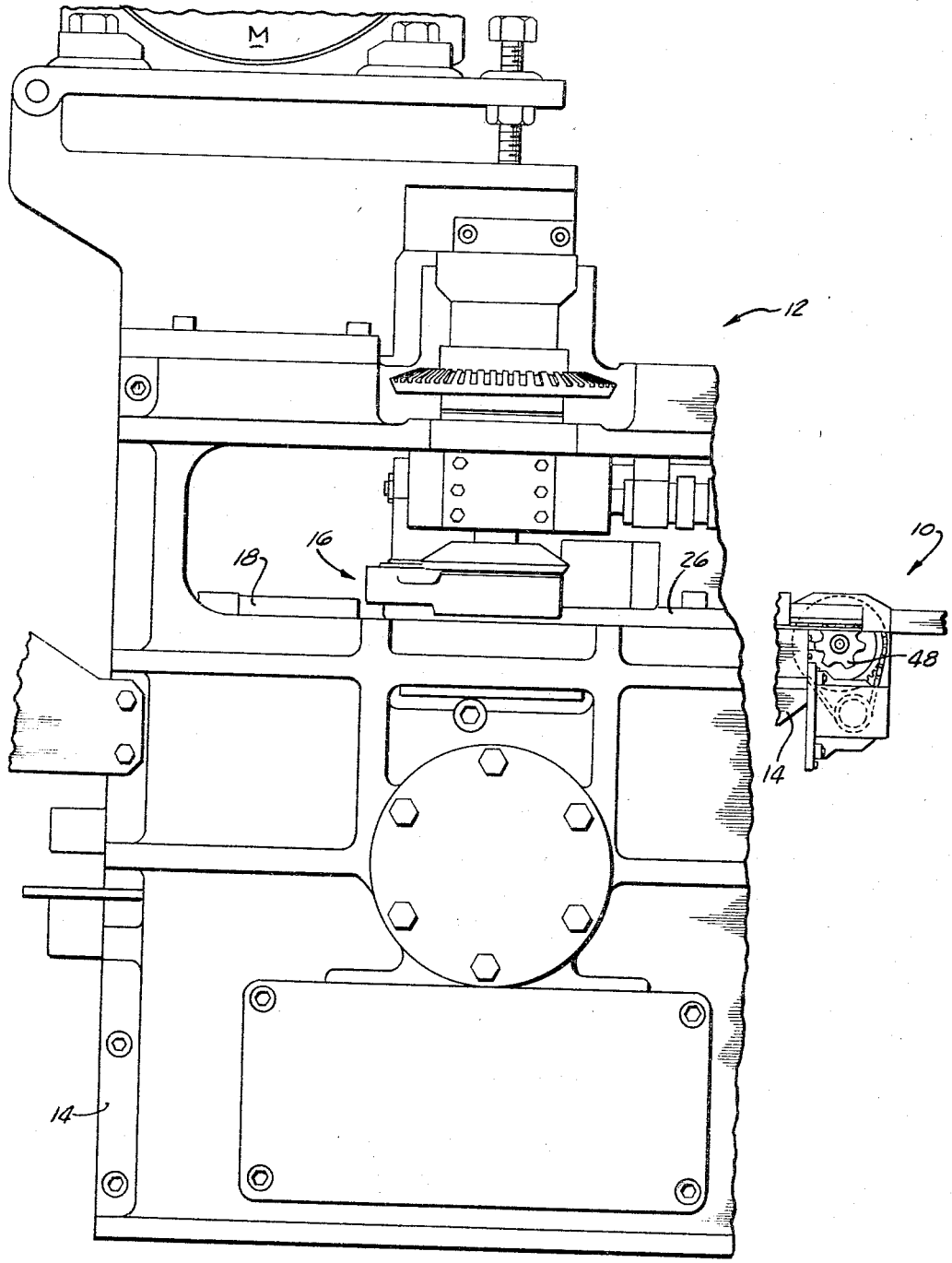
FIGURE 1 is a foreshortened front elevational view of a wire bending machine showing the control apparatus of this invention in assembly relation therewith, with some parts broken away and other parts shown in section for the purpose of clarity.

With reference to the drawing, the control apparatus of this invention, indicated generally at 10, is illustrated in FIG. 1 in assembly relation with a wire bending machine of the kind illustrated in U.S. Patent No. 2,849,031. The machine 12 consists essentially of a main frame 14 which supports a wire forming and transfer mechanism 16, the details of which form no part of the present invention and which is therefore not described in detail herein. The mechanism 16 is driven by a motor M and receives wire through an entrance wire guard 18. The wire which enters the guard 18, and which is drawn therethrough by the mechanism 16, originates from a large coil which is supported on a reel (not shown). This wire is either previously straightened before entering the guard 18 or is preferably first extended through a wire guiding apparatus of the type described in copending application, Ser. No. 397,681, filed Sept. 21, 1964, entitled "Wire Guiding Apparatus" and owned by the assignee of this application. The mechanism 16 is thus supplied with a continuous length of wire until a supply coil runs out, after which another supply coil is substituted.

The continuous length of wire entering the machine 12 through the entrance guard 18 is bent by the mechanism 16 to the shape illustrated for the wire 20 in FIG. 2. As shown therein, the wire 20 is of sinuous shape having a plurality of evenly spaced substantially parallel straight cross wire portions 22 adjacent ones of which are connected at their ends by curved, substantially U-shaped connecting wire portions 24. The sinuous wire 20, during operation of the machine 12, is continuously discharged from the mechanism 16 through an exit wire guard 26. The wire traveling through the guard 26 is traveling along a generally horizontal path and subsequently travels onto a generally horizontal bed 28 having upright side walls 30 spaced apart a distance corresponding substantially to the width of the sinuous wire 20 so as to confine the wire and prevent substantial sideways deflection of the moving wire strip. A flat plate 32, mounted on the bed 28, is positioned in a spaced relation above the bed 28 so that the space 34 therebetween is slightly greater than the thickness of the wire in the sinuous strip 20 which travels through the space 34.

The control apparatus 10 of this invention includes a mounting plate 36 which is secured to the main frame 14, such as by bolts 38, at a position beneath the bed 28. A horizontal shaft 40, rotatably supported on the mounting plate 36, has a wheel 42 secured to it for rotation therewith, at the position in vertical alignment with vertically aligned slots 44 and 46 in the bed 28 and the plate 32, respectively. As shown in FIGS. 1 and 4, the wheel 42 is formed with a plurality of radially extending teeth 48 of a length to project through the slots 44 and 46. The circumferential spacing of the teeth 48 corresponds substantially to the horizontal spacing of the cross wire portions 22 in the sinuous wire strip 20.

As a result, during horizontal movement of the strip 20 through the space 34, successive cross wire portions 22 in the strip 20 will engage successive teeth 48 on the wheel 42 so as to rotate the wheel in a clockwise direction as viewed in FIG. 1. Rotation of the wheel 42 results in rotation of the shaft 40 and consequent rotation of a sprocket 50 secured to the shaft 40 at a position to one side of the bed 28. The sprocket 50 is vertically aligned with a smaller sprocket 52 and a sprocket chain 54 is trained about the sprockets 50 and 52. The sprocket 52 is secured to a shaft 56 for a zero speed switch 58 which is secured to the mounting plate 36 at a position below the wheel 42.

The details of the zero speed switch 58 form no part of the present invention, so that it is not described in detail herein. Any switch having contacts which move to different positions when the rate of rotation of the shaft 56 falls below a predetermined rate is satisfactorily usable as the zero speed switch 58 in the apparatus 10 of this invention. One such suitable switch is the "Bulletin 808-Zero Speed Switch" manufactured by the Allen Bradly Co. of Milwaukee, Wis. In this switch, the normally open contacts are closed at any speed above the contact operating speed of the switch. As the shaft speed is reduced below the pre-set contact operating speed, however, an electromagnetic torque holding the contacts closed is also reduced, until a point is reached, where an opposing spring force is great enough to open the contacts. In the apparatus 10, the contact operating speed of switch 58 is set at any desired speed of shaft 56 below the speed at which shaft 56 is rotated during a normal operation of machine 12 to move sinuous wire 20 past switch operating wheel 42.

In the operation of the apparatus 10, assume that wire is being drawn through the entrance wire guard 18 by the mechanism 16, the wire is being bent to form the strip 20 which is then being moved along a horizontal path through the exit wire guard 26 and across the bed 28. During movement of the strip 20 through the space 34, the cross wire portions 22 engage the teeth 48 on the wheel 42 so as to rotate the shaft 40. This results in rotation of the sprocket 50 which rotates the sprocket 52 which in turn rotates the shaft 56 for the zero speed switch 58. This rotation of shaft 56 maintains normally open contacts 60 in the switch 58 closed as indicated in broken lines as 62 in FIG. 5.

As shown diagrammatically in FIG. 5, the switch 58 and the motor M are connected in series across a pair of conductors 64. Consequently, so long as the shaft 56 continues to rotate so as to maintain the contacts 60 closed, the motor M continues to drive the mechanism 16. However, in the event the supply of wire to the entrance wire guard 18 is discontinued, which happens when the wire in one coil of wire is used up, there is no sinuous wire strip traveling through the space 34 so that rotation of the wheel 42 is discontinued with a consequent discontinuance of rotation of the shaft 56 for the zero speed switch 58. At such time, contacts 60 are opened as indicated in solid lines at 62 in FIG. 5. The circuit for the motor M is thus opened at the switch 58 so that the motor M is shut off. Unnecessary running of the machine 12 when there is no supply of wire is thus avoided. Also, in the event there is a jam-up of wire in the machine 16 or the machine malfunctions for some other reason so that a continuous horizontal movement of a sinuous wire strip 20 through the space 34 is discontinued, the shaft 56 will cease to be rotated so that the zero speed switch 58 will operate to shut off the motor M. This avoids unnecessary operation of the machine 10 which could result in damage to the machine.

From the above description is is seen that this invention provides control apparatus 10 in which the toothed wheel 42 is mounted for rotation about an axis substantially parallel to the cross wire portions 22 moving through the space 34 during movement of the strip 20 along a horizontal path. As a result of the spacing of the teeth 48 on the wheel 42 so that it corresponds to the spacing of the cross wire portions 22, the wheel 42 is continuously rotated so long as there is continuous movement of a wire strip 20 through the space 34. The switch 58 has contacts 60 which are maintained closed only during rotation of the wheel 42. Consequently, when the wheel 42 ceases to operate, the contacts 60 are opened and the drive motor M for the machine 12 is shut off.

It will be understood that the wire bending machine control apparatus which is herein disclosed and described is presented for purposes of explanation and illustration and is not intended to indicate limits of the invention, the scope of which is defined by the following claims.

What is claimed is:

1. In a machine in which sinuous wire having evenly spaced substantially parallel cross wire portions is moved along a predetermined path substantially perpendicular to said cross wire portions, a wheel mounted for rotation about an axis substantially parallel to said cross wire portions, said wheel having evenly spaced teeth thereon the circumferential spacing of which corresponds substantially to the spacing of said cross wire portions, said wheel being positioned so that said teeth extend into said path on rotation of said wheel so that said wheel is rotated by engagement of said cross wire portions with said teeth during movement of said sinuous wire along said path, and means operatively associated with said wheel for discontinuing operation of said machine in response to predetermined interruption in the rotary movement of said wheel.

2. In a machine adapted to have wire continuously fed to it for bending into a sinuous shape and for subsequent continuous movement along a predetermined path, and wherein said sinuous shape wire has equally spaced cross wire portions which extend transversely of said path; a rotatable wheel having teeth thereon, said wheel being positioned so that one of said teeth projects into said path for engagement with a cross wire portion whereby said wheel is continuously rotated during movement of said sinuous shape wire along said path, and a shut off switch for said machine connected to said wheel so that in response to a cessation of rotation of said wheel said switch operates to shut off said machine.

3. In a machine adapted to have wire continuously fed to it for bending into a sinuous shape and for subsequent continuous movement along a predetermined path, and wherein said sinuous shape wire has equally spaced cross wire portions which extend transversely of said path; a rotatable wheel having teeth thereon, said wheel being positioned so that one of said teeth projects into said path for engagement with a cross wire portion whereby said wheel is continuously rotated during movement of said sinuous shape wire along said path, and a zero speed shut off switch for said machine, said switch having a shaft and contacts which are maintained closed by rotation of said shaft, and drive means connected to and extending between said wheel and said shaft providing for rotation of said shaft in response to rotation of said wheel.

References Cited

UNITED STATES PATENTS

| | | | |
|---|---|---|---|
| 1,048,268 | 12/1912 | Altenhof | 72—5 |
| 1,452,356 | 4/1923 | Bourn | 72—4 |
| 2,101,382 | 12/1937 | Donovan et al. | 72—5 |
| 2,676,621 | 4/1954 | Bank et al. | 140—105 X |
| 2,737,212 | 3/1956 | Huszar | 140—105 X |
| 2,849,031 | 8/1958 | Blumensaadt | 140—71 |

WILLIAM J. STEPHENSON, *Primary Examiner.*